United States Patent
Bildstein et al.

(10) Patent No.: US 9,821,674 B2
(45) Date of Patent: Nov. 21, 2017

(54) METHOD, DEVICE AND SYSTEM FOR DETERMINING A POSITION OF A VEHICLE

(71) Applicant: Robert Bosch GmbH, Stuttgart (DE)

(72) Inventors: Michael Bildstein, Stuttgart (DE); Bernd Eckert, Vaihingen an der Enz (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/024,112

(22) PCT Filed: Jul. 28, 2014

(86) PCT No.: PCT/EP2014/066147
§ 371 (c)(1),
(2) Date: Mar. 23, 2016

(87) PCT Pub. No.: WO2015/043797
PCT Pub. Date: Apr. 2, 2015

(65) Prior Publication Data
US 2016/0229304 A1    Aug. 11, 2016

(30) Foreign Application Priority Data

Sep. 25, 2013   (DE) .................. 10 2013 219 239

(51) Int. Cl.
*G01D 5/20* (2006.01)
*B60L 11/18* (2006.01)
(Continued)

(52) U.S. Cl.
CPC ......... *B60L 11/1831* (2013.01); *B60L 11/182* (2013.01); *B60L 11/1827* (2013.01);
(Continued)

(58) Field of Classification Search
CPC . G01D 5/20; H02J 7/025; H02J 50/50; G01R 33/383; G01C 17/38; B60L 11/182;
(Continued)

(56) References Cited

U.S. PATENT DOCUMENTS

| 4,314,479 A | * | 2/1982 | Spijkerman | .......... | G01N 29/228 |
| | | | | | 73/643 |
| 5,774,034 A | * | 6/1998 | Yoneda | ................ | G01R 33/383 |
| | | | | | 324/320 |

(Continued)

FOREIGN PATENT DOCUMENTS

| CN | 102252675 | 11/2011 |
| CN | 102741083 | 10/2012 |

(Continued)

OTHER PUBLICATIONS

International Search Report for Application No. PCT/EP2014/066147 dated Jan. 28, 2015 (English Translation, 2 pages).

*Primary Examiner* — Yuri Kan
(74) *Attorney, Agent, or Firm* — Michael Best & Friedrich LLP

(57) ABSTRACT

The invention relates to a method, to a device, and to a system for determining a position of a vehicle. The method comprises the method steps: Measuring (S01) at least one first magnetic field strength of a magnetic field at one each first position (A-i) by means of a first magnetic field sensor (11) arranged on a vehicle (1); measuring (S02) at least one second magnetic field strength of the magnetic field at one each second position (B-i) by means of a second magnetic field sensor (12) arranged on the vehicle (1) at a distance from the first magnetic field sensor (11); determining (S03) position data of the vehicle (1) at least by comparing data, which are based on the measured first and second magnetic field strengths, to a predetermined magnetic field data of the (Continued)

magnetic field; and outputting (S04) a signal based on said position data.

16 Claims, 4 Drawing Sheets

(51) Int. Cl.
  *H02J 5/00* (2016.01)
  *H02J 7/02* (2016.01)
(52) U.S. Cl.
  CPC ....... *B60L 11/1829* (2013.01); *B60L 11/1833* (2013.01); *G01D 5/20* (2013.01); *H02J 5/005* (2013.01); *H02J 7/025* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/14* (2013.01)
(58) Field of Classification Search
  CPC ....... B60L 5/005; G07B 15/063; H01F 38/14; G01N 29/228
  See application file for complete search history.

(56) References Cited

U.S. PATENT DOCUMENTS

| | | | | |
|---|---|---|---|---|
| 2004/0098301 | A1* | 5/2004 | Aoki | G07B 15/063 705/13 |
| 2007/0101596 | A1* | 5/2007 | Olson | G01C 17/38 33/356 |
| 2010/0225271 | A1* | 9/2010 | Oyobe | B60L 5/005 320/108 |
| 2011/0204845 | A1* | 8/2011 | Paparo | H01F 38/14 320/108 |
| 2011/0221387 | A1* | 9/2011 | Steigerwald | B60L 11/182 320/108 |
| 2011/0254503 | A1 | 10/2011 | Widmer et al. | |
| 2012/0146426 | A1 | 6/2012 | Sabo | |
| 2013/0033224 | A1* | 2/2013 | Raedy | H02J 7/025 320/107 |
| 2014/0070764 | A1* | 3/2014 | Keeling | H02J 50/50 320/108 |
| 2014/0257614 | A1* | 9/2014 | Niizuma | B60L 11/182 701/22 |
| 2015/0061576 | A1* | 3/2015 | Chen | B60L 11/182 320/108 |
| 2015/0137801 | A1* | 5/2015 | Raedy | H02J 7/025 324/207.15 |
| 2016/0089987 | A1* | 3/2016 | Ichikawa | B60L 11/182 701/22 |

FOREIGN PATENT DOCUMENTS

| | | |
|---|---|---|
| CN | 103246285 | 8/2013 |
| JP | 2010051089 | 3/2010 |
| JP | 2013524761 | 6/2013 |
| WO | 2011114208 | 9/2011 |
| WO | 2012096169 | 7/2012 |
| WO | 2012121184 | 9/2012 |
| WO | 2012142040 A1 | 10/2012 |

\* cited by examiner

METHOD, DEVICE AND SYSTEM FOR DETERMINING A POSITION OF A VEHICLE

BACKGROUND OF THE INVENTION

The present invention relates to a method, an apparatus and a system for ascertaining a position of a vehicle. In particular, it relates to a method and an apparatus for ascertaining a position of a vehicle in surroundings for inductively charging a storage battery of the vehicle, for example a charging point. In addition, it relates to a method, an apparatus and a system for ascertaining a position and for positioning a reception coil, arranged on a vehicle, preferably in relation to a predetermined charging position of the reception coil.

Electrically driven vehicles, for example electric vehicles, store energy for operating an electric motor usually in a storage battery. Such storage batteries can be charged by means of inductive charging, for example. Often, inductive charging systems of this kind are in the form of underfloor systems, wherein an electrically driven vehicle having a reception coil is positioned over a transmission coil having corresponding electronics that is embedded in a floor. The transmission coil is used to induce a current in the reception coil, which current charges the storage battery. The correct orientation of the reception coil relative to the transmission coil can be a significant limiting factor for the efficiency of an inductive charging system of this kind. The transmission coil is usually in a form such that a greatest possible efficiency for inductive charging is obtained when the reception coil is positioned in a predetermined charging position relative to the transmission coil.

WO 2011/114208 A2 describes a method for positioning an electric vehicle and also a corresponding electric vehicle. In this case, a camera records an exterior image of the electric vehicle that is displayed on a screen inside the vehicle. On the basis of the displayed camera image, a driver of the vehicle can orient the electric vehicle by eye.

SUMMARY OF THE INVENTION

The present invention discloses a method, an apparatus and a system. The invention likewise includes a vehicle having the apparatus according to the invention.

The concept on which the present invention is based consists in additionally using the hardware required for the inductive transmission of energy to position a reception coil of a vehicle relative to a transmission coil in a predetermined charging position. First and second magnetic field sensors arranged on the vehicle are used to measure a magnetic field, which extends at least over the predetermined charging position, once or repeatedly. The measured magnetic field strengths can be compared directly with a predetermined magnetic field information item of the magnetic field, and a current position of the magnetic field sensors relative to the magnetic field can then be inferred. It is also possible for data that are based on the measured first and second magnetic field strengths to be compared with the predetermined magnetic field information item. By way of example, the measured first and second magnetic field strengths—and possibly further measurements—can be taken as a basis for computing magnetic field strength gradients.

The predetermined magnetic field information item can comprise a predetermined magnetic field strength distribution, that is to say information about magnetic field lines of the magnetic field, which is to say magnetic field strengths and magnetic field directions as a function of a surface area or a space. The magnetic field strength distribution can be indicated relative to a fixed origin. Situated at the origin there may be, by way of example, a magnetic field generating apparatus, for example a transmission coil for inductive charging. Alternatively, the magnetic field information item can comprise information about a type of the magnetic field generating apparatus, for example that it is a circular coil and the magnetic field strength gradient distribution that a field produced by such a coil has.

From the predetermined magnetic field strength distribution, or from supplementary information, it may be known where the transmission coil is situated relative to the magnetic field strength distribution. In addition, it is known how the first and second magnetic field sensors and possibly further magnetic field sensors are arranged relative to a reception coil of the vehicle on which the magnetic field sensors are arranged. This allows the measured magnetic field strengths to be used to ascertain position data for the vehicle, particularly position data for the reception coil of the vehicle, particularly relative to the transmission coil.

As intended, the transmission coil of an inductive charging system is suitable for forming the magnetic field. The transmitter end thus advantageously requires no, or only very few, additional electronic elements. The method according to the invention and the system according to the invention can therefore be used particularly inexpensively and in a versatile manner. Position-tolerant coil systems are not needed. The apparatus according to the invention can work with any transmission coil type in principle, that is to say that there is a high level of interoperability.

According to one preferred development of the method according to the invention, the measurement of the first and second magnetic field strengths is performed regularly or continuously. Continuous measurement allows the precision of the method according to the invention to be improved further. Regular measurement—instead of continuous—allows the required computation complexity to be decreased. The measurement rate between an instance of measurement and a subsequent instance of measurement can also be dynamically adjusted. By way of example, the measurement can first of all be effected regularly at first intervals of time. If the magnetic field sensors are situated close to a position in which the reception coil is arranged at the predetermined charging position, the measurement can be effected at second intervals of time, for example, which are shorter than the first intervals of time. Such more precise definition of the measurement by means of respective decreasing intervals of time can also be repeated multiple times. If the reception coil is situated within a predetermined maximum distance of the predetermined charging position, the measurement can finally be performed continuously in order to allow particularly accurate fine orientation.

According to a further preferred development, the magnetic field is produced by formation of a residual magnetization in a coil. By way of example, a past instance of inductive charging by the transmission coil may have involved the production of a residual magnetization in the coil that lasts beyond the inductive charging process. A magnetic field information item, for example a magnetic field strength distribution according to the residual magnetization, may be known, particularly if it remains essentially the same after all the inductive charging processes. Alternatively, the magnetic field strength distribution of the residual magnetization can be measured automatically, for example after each inductive charging process.

According to a further preferred development, the magnetic field is produced by application of a voltage to a coil.

That is to say that the magnetic field is generated by a voltage applied to a coil. By way of example, a transmission coil that is intended for inductive charging can have a predetermined electric current applied to it before the start of the inductive charging process. In this case, the predetermined magnetic field strength distribution of the magnetic field may be known on account of the known properties of the transmission coil and of the applied current. Advantageously, it is possible to apply a current that firstly produces a distinctly measurable and sufficiently inhomogeneous magnetic field strength distribution for the magnetic field and that, in so doing, simultaneously consumes less electric power than a further electric current that is applied to the transmission coil during the inductive charging process.

According to a further preferred development, the magnetic field is produced continuously or in a pulsating manner. In this case too, depending on the required accuracy and the desired objectives, it is possible to set a balance between increased accuracy of the measurement by dint of more frequent or continuous production of the magnetic field and the desire for energy saving by dint of less frequent production of the magnetic field. If a magnetic field generating apparatus that can produce the magnetic field is coupled to a rudimentary positioning system, for example, then the frequency of the pulsating production of the magnetic field can also be dynamically adjusted. By way of example, it is thus possible for the frequency of the pulsating production of the magnetic field to be increased if a vehicle sensor coupled to the magnetic field generating apparatus, for example a light barrier, establishes that the vehicle with the reception coil is roughly approaching a position in which the reception coil is arranged at the predetermined charging position.

According to a further preferred development, the method according to the invention additionally has the method step of: wireless transmission of the predetermined magnetic field information item, for example the magnetic field strength distribution, to a communication device of the vehicle. Hence, it is not necessary for the magnetic field of different charging points or charging stations for inductively charging the vehicle always to have the same magnetic field strength distribution. Instead, it is possible, for example when the vehicle approaches a particular charging point, for the respective individual magnetic field strength distribution of a magnetic field of the charging point to be transmitted to the communication device of the vehicle as a predetermined magnetic field information item. By way of example, the transmission can be effected on a request by the vehicle. The request by the vehicle can be transmitted by a communication device of the vehicle, for example as soon as a magnetic field sensor of the vehicle measures a magnetic field strength above a predetermined minimum value. The versatility of the method according to the invention is increased further thereby, since this allows it to work with any desired charging point, for example.

If there is a predetermined number of different forms of inductive charging systems that are used in charging points and that each have different magnetic field information items, it is also possible for just a simple identification code, for example to be transmitted to the communication device of the vehicle. The communication device can then take the transmitted code as a basis for reading from a preprogrammed memory of the communication device the magnetic field information item denoted by the code and can forward said information item for use in the method according to the invention.

According to a further preferred development, a first magnetic field strength gradient is determined at a third position. It is also possible for a second magnetic field strength gradient to be determined at a fourth position. Advantageously, the first and second magnetic field strength gradients are determined essentially at the first and second positions, respectively, and essentially simultaneously with the measurement of the first and second magnetic field strengths. The first and second magnetic field strength gradients may therefore also be data that are based on the measured first and second magnetic field strengths. By way of example, the first and second magnetic field strength gradients can be determined by dint of magnetic field strengths being measured multiple times in the surroundings of the third and fourth positions. These measured magnetic field strengths and, by way of example, a known movement of the vehicle can be used to determine the respective magnetic field strength gradient. The ascertainment of the position data of the vehicle may additionally be based on a comparison of the first and/or the second magnetic field strength gradient with the predetermined magnetic field information item of the magnetic field.

Since magnetic field strength gradients are also compared with magnetic field strength gradients of the predetermined magnetic field information item of the magnetic field, the method can be speeded up and/or can be effected with increased precision. When the vehicle moves in a forward direction, for example, toward a desired position at which, according to the predetermined magnetic field information item, magnetic field strengths are higher than at a present position of the vehicle, the magnetic field strength gradients determined as positive, for example, can be used to infer that the vehicle should advantageously move on without a change of direction. If negative magnetic field strength gradients are determined in the same situation, that is to say if the magnetic field strengths are weaker for the present movement of the vehicle, then it can be inferred that a change of direction for the vehicle is advantageous.

In the region of the predetermined charging position, the magnetic field is frequently relatively homogenous locally. If the measured magnetic field strength gradients become shallower or disappear during movement of the vehicle, it can be inferred from this that the predetermined charging position has been reached or has almost been reached.

If the vehicle has more than two magnetic field sensors, for example three, four or more magnetic field sensors, produced on it, it is accordingly possible for each of the magnetic field sensors to be used not just to determine the magnetic field strength at a present position of the respective magnetic field sensor but also, additionally, to determine a magnetic field strength gradient at the corresponding position. In this case, it may suffice if the magnetic field information item comprises an information item concerning what type of coil—for example a circular coil—produces the magnetic field and what magnetic field strength gradient distribution such a coil has. In this case, the magnetic field strength gradient distribution may also comprise purely relative values, in contrast to absolute values. This information item may also be preprogrammed and constant, so that no transmission of signals is required. The ascertainment of the position data of the vehicle can therefore also be effected exclusively on determination of magnetic field strength gradients, that is to say changes in the magnetic flux density, of the magnetic field. In this case, information about magnetic field strengths of the magnetic field is not necessary as part of the magnetic field information item, but can be used for plausibilization, for example.

According to a further preferred development, at least one further magnetic field sensor is used to measure at least one third magnetic field strength of the magnetic field simultaneously with the measurement of the first magnetic field strength and simultaneously with the measurement of the second magnetic field strength. In this case, the at least one further magnetic field sensor is arranged on the vehicle at a distance from every other magnetic field sensor. The ascertainment of the position data of the vehicle can therefore still also be based on a comparison of the at least one third magnetic field strength with the predetermined magnetic field information item of the magnetic field.

BRIEF DESCRIPTION OF THE DRAWINGS

The present invention is explained in more detail below on the basis of the exemplary embodiments that are shown in the schematic figures of the drawings, in which.

Throughout the figures, elements and apparatuses that are the same or have the same function are—unless otherwise stated—provided with the same reference symbols.

DETAILED DESCRIPTION

Figure 1:
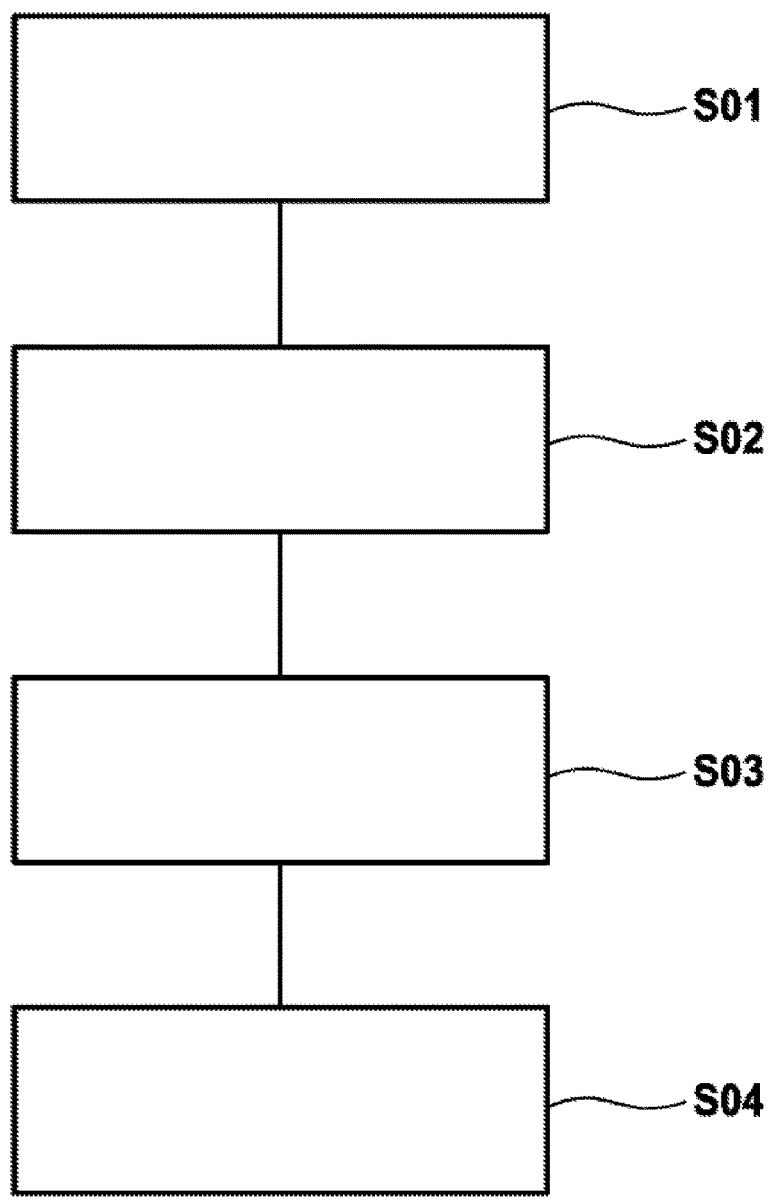
FIG. 1 shows a schematic flowchart to illustrate a method according to the invention based on a first embodiment of the present invention.

FIG. 1 shows a schematic flowchart to illustrate a method according to the invention based on the first embodiment. For the description of FIG. 1, the text below also uses reference symbols that relate to the subsequent FIGS. 2 and 3.

In a first method step S01, at least one first magnetic field strength of a magnetic field is measured at a respective first position A-i by means of a first magnetic field sensor 11. In this case, the first magnetic field sensor 11 is arranged on a vehicle 1.

In a further method step S02, at least one second magnetic field strength of the magnetic field is measured at a respective second position B-i by means of a second magnetic field sensor 12. The second magnetic field sensor 12 is arranged on the vehicle 1 at a distance from the first magnetic field sensor 11. Advantageously, the measurement S02, S03 using the first and second magnetic field sensors 11, 12 is effected simultaneously each time. If the measurement is not effected simultaneously, then a known arrangement of the magnetic field sensors 11, 12 in relation to one another and a known movement of the vehicle 1 and a known time difference between the measurement S01 and the measurement S02 mean that it is possible to infer where the second position B-i is situated in relation to the first position A-i.

When the measurement S02 is effected simultaneously with the measurement S01, a known positional relationship between the first magnetic field sensor 11 and the second magnetic field sensor 12 means that it is known what positional relationship there is between the first position A-i and the second position B-i. This approach is possible in a pertinent manner for all first positions A-i and all second positions B-i. The known movement of the vehicle 1 and known time intervals between the measurement S01 at the respective first positions A-i mean that it is also possible to infer a positional relationship between the first measurement positions A-i themselves. The same approach is possible for the second positions B-i. By way of example, the movement of the vehicle 1 may be known from information about the movement of the vehicle being determined and transmitted by a navigation apparatus of the vehicle.

In a method step S03, at least comparison of the measured first and second magnetic field strengths with a predetermined magnetic field strength distribution of the magnetic field ascertains position data for the vehicle 1. The ascertainment S03 may additionally be based on navigation data from the vehicle that can be provided by the navigation apparatus of the vehicle. By way of example, the navigation data may comprise information about a rotation of wheel axles and a position of wheels 5 of the vehicle 1. On the basis of, by way of example, integrated rotation rates of the wheels 5 in combination with the respective yaw position of the wheels 5, it is thus possible to reconstruct a trajectory of the vehicle 1. Hence, a current position of the vehicle can be physically related to the first positions A-i and the second positions B-i.

Comparison of the measured first and second magnetic field strengths at the physically related first and second positions A-i, B-i with the known magnetic field strengths of the predetermined magnetic field strength distribution of the magnetic field thus allows ascertainment of a current position of the vehicle 1 in relation to the predetermined magnetic field strength distribution. Furthermore, it is known where a reception coil 3 formed on the vehicle 1 is arranged. Hence, the position data ascertained for the vehicle 1 in method step S03 may also include information about where the reception coil 3 of the vehicle 1 is situated relative to the predetermined magnetic field strength distribution of the magnetic field.

In addition, it is known where the predetermined charging position is situated relative to the predetermined magnetic field strength distribution of the magnetic field. By way of example, the predetermined charging position is a position at which the reception coil 3 of the vehicle 1 should be situated in order to allow inductive energy transmission from a transmission coil to the reception coil with the greatest possible efficiency. Hence, the position data for the vehicle 1 can also include information about where the reception coil 3 of the vehicle 1 is currently situated relative to the predetermined charging position.

In a method step S04, the position data are taken as a basis for outputting a signal. The output signal may be a control signal, for example. If the vehicle 1 has an apparatus for automatically controlling the vehicle 1, for example, then the output signal may be a control signal to this control apparatus. Such a control apparatus may be designed as part of an automatic parking aid in the vehicle 1, for example. The control signal can then instruct the control apparatus to move the vehicle 1 such that the reception coil 3 comes to rest at the predetermined charging position.

The output signal may alternatively be a control guideline for a user. The control guideline can instruct the user regarding how he needs to control the vehicle 1 in order to position the vehicle 1 such that the reception coil 3 comes to rest in the predetermined charging position. The control instruction can be provided audibly, for example. A first beep may represent the instruction to steer the vehicle more to the left, for example, while a second beep may represent the instruction to steer the vehicle further to the right. Alternatively, the audible control guideline can also be provided as a voice output. By way of example, a computer voice could give instructions such as "forward", "backward", "left" or "right". These direction instructions could additionally be augmented by quantifiers such as "about", "a little" or by precise statements such as "one meter" or the like.

The control instructions can also be provided visually, for example by virtue of direction arrows being displayed on a screen of the vehicle 1 or a schematic diagram comparing the present position of the vehicle 1 with a desired position of the vehicle 1. In this case, the desired position of the vehicle 1 is a position of the vehicle 1 in which the reception coil 3 comes to rest in the predetermined charging position.

Figure 2:
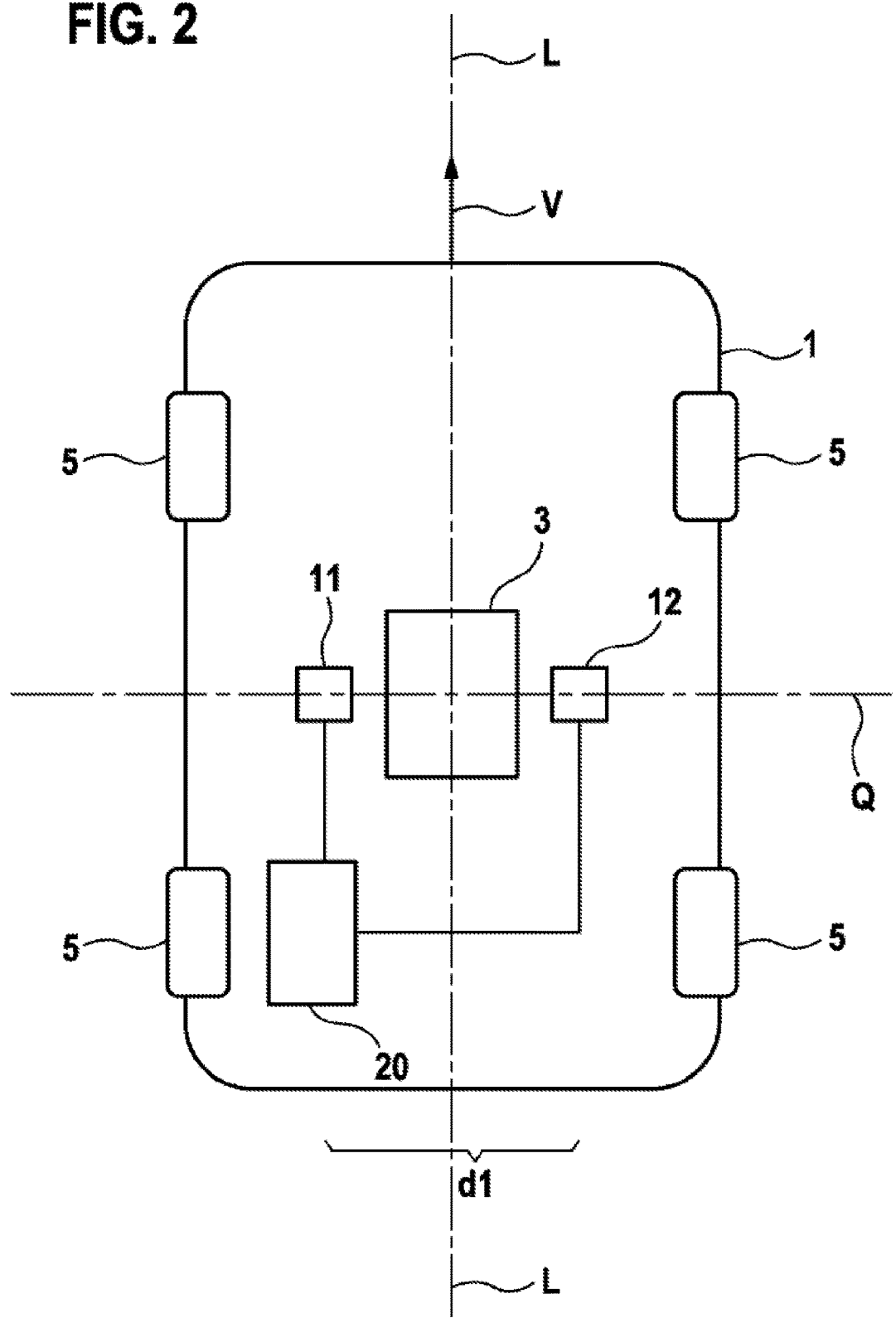
FIG. 2 shows a schematic illustration of a vehicle with an apparatus for ascertaining a position of a vehicle based on a second embodiment of the present invention.

FIG. 2 shows a schematic illustration of a vehicle with an apparatus according to the invention for ascertaining a position of the vehicle.

In FIG. 2, a first magnetic field sensor 11 and a second magnetic field sensor 12 are produced on the vehicle 1. The first and second magnetic field sensors 11, 12 are arranged along a lateral axis Q of the vehicle 1 at the distance dl from one another. The lateral axis Q is at right angles to a longitudinal axis L of the vehicle 1. When traveling straight ahead in the forward direction V, the vehicle 1 moves along the longitudinal axis L. The first magnetic field sensor 11 and the second magnetic field sensor 12 have the reception coil 3 arranged between them. The reception coil 3 is particularly a reception coil for inductively charging a storage battery of the vehicle 1. The reception coil 3 may be arranged in a manner centered relative to the longitudinal axis L and/or the lateral axis Q. An eccentric arrangement is likewise possible.

Advantageously, the first and second magnetic field sensors 11, 12, viewed from above or below, are arranged closer to the reception coil 3 than to either lateral outer edge of the vehicle 1. The magnetic field sensors 11, 12 are advantageously arranged on an outer side of the vehicle 1 that, when the reception coil 3 is situated at the predetermined charging position, points in the direction of a transmission coil that is designed and arranged to inductively transmit electric power to the reception coil 3 in the predetermined charging position. In the case of inductive charging systems implemented as underfloor systems, the transmission coil is situated in a floor. In the predetermined charging position, the vehicle 1 and hence the reception coil 3 are situated above the transmission coil. Accordingly, the magnetic field sensors 11, 12 are advantageously arranged on the underside of the vehicle 1.

In FIG. 2, the magnetic field sensors 11, 12 are additionally coupled to a computation device 20 of the vehicle 1. The computation device 20 is designed to perform at least the ascertainment S03 of the position data of the vehicle 1. The computation device 20 can also perform or prompt the output S04 of the signal or preparatory steps therefor. By way of example, the computation device 20 can be used to take the current position of the reception coil 3 relative to the predetermined charging position as a basis for determining what driving instructions or control guidelines for a driver of the vehicle 1 lead—when followed and correctly executed—most quickly and/or most easily to the reception coil 3 coming to rest at the predetermined charging position.

Figure 3:
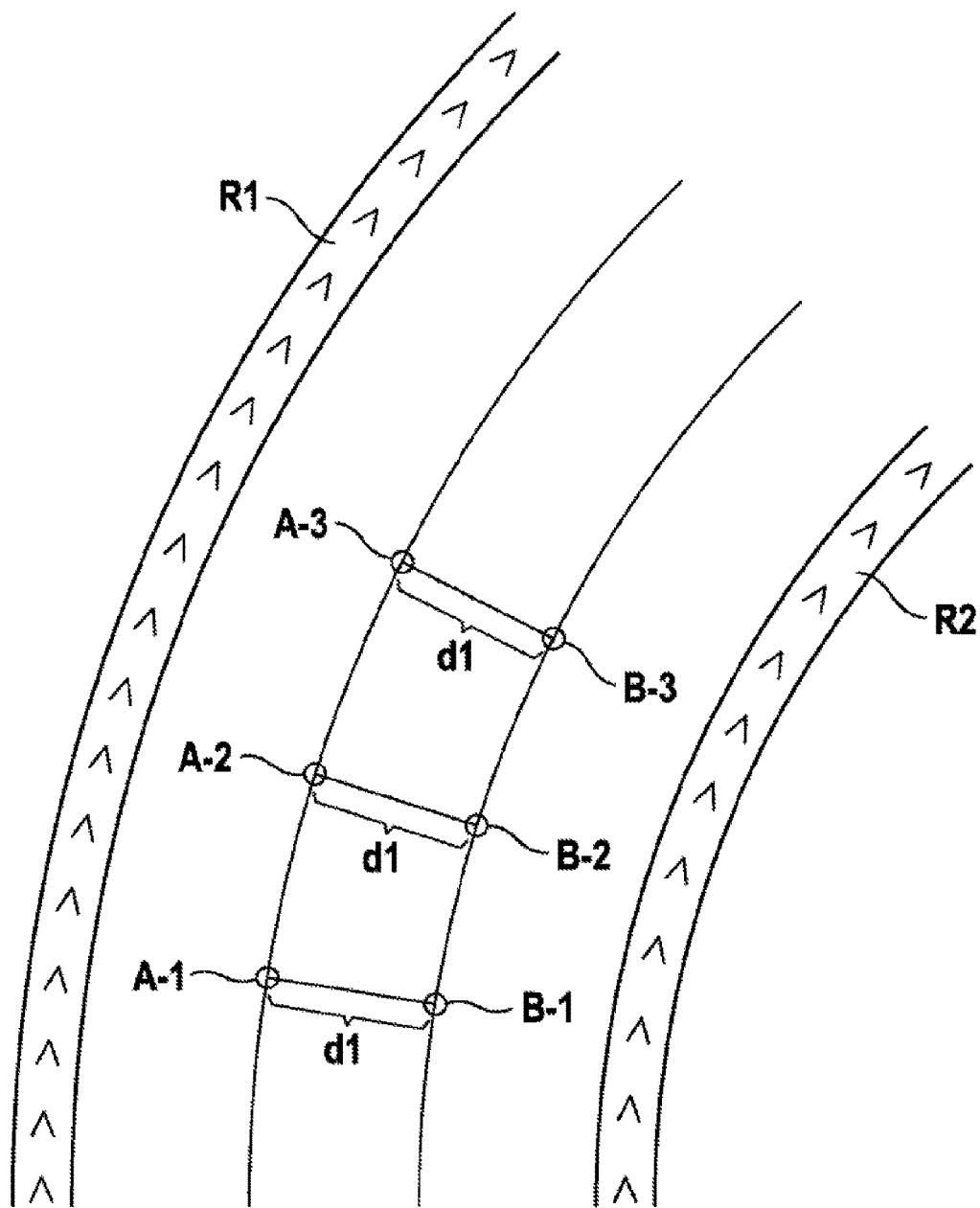
FIG. 3 show a schematic illustration of first and second positions at which magnetic field strengths are measured in order to explain a method according to the invention.

FIG. 3 shows a schematic illustration of first and second positions at which magnetic field strengths are measured in order to explain a method according to the invention.

FIG. 3 schematically shows pathway tracks R1, R2 taken by the tires 5 in order to illustrate a movement by the vehicle 1 during the method according to the invention. At a first time, the first magnetic field sensor 11 measures a first magnetic field strength at the first position A-1. Simultaneously, the second magnetic field sensor 12 is used to measure a second magnetic field strength at the second position B-1. According to the apparatus based on the second embodiment, the distance d1 is situated between the first position A-1 and the second position B-1. The first magnetic field sensor 11 additionally measures a further first magnetic field strength at the further first position A-2 at a second time and yet a further first magnetic field strength at the further first position A-3 at a third time. The second magnetic field sensor 12 additionally measures a further second magnetic field strength at the further second position B-2 at the second time and yet a further first magnetic field strength at the further second position B-3 at the third time.

There are therefore three measured first magnetic strengths and three measured second magnetic field strengths available at a total of six different positions. The physical positional relationships between these six positions A-i, B-i may be known on the basis of navigation data from the vehicle 1, for example. Hence, a physical structure of six known magnetic field strengths is obtained, which can be compared with the predetermined magnetic field strength distribution of the magnetic field. If essentially these six magnetic field strengths are explicitly determinable with essentially the same positional relationships with one another in the magnetic field strength distribution of the magnetic field, then the current position of the vehicle 1 relative to the magnetic field strength distribution is determined.

It is also possible for more or fewer measurements to be taken at more or fewer different times. After a particular number of measurements, for example six, as indicated in FIG. 3, it is possible for sufficiently accurate positioning finding for the vehicle 1 relative to the predetermined magnetic field strength distribution of the magnetic field to have been successfully performed. Alternatively, for every single measurement S01, S02, position data for the vehicle 1 can be ascertained S03 separately, with the respective signal S04 being able to be output on the basis of the position data.

Figure 4:
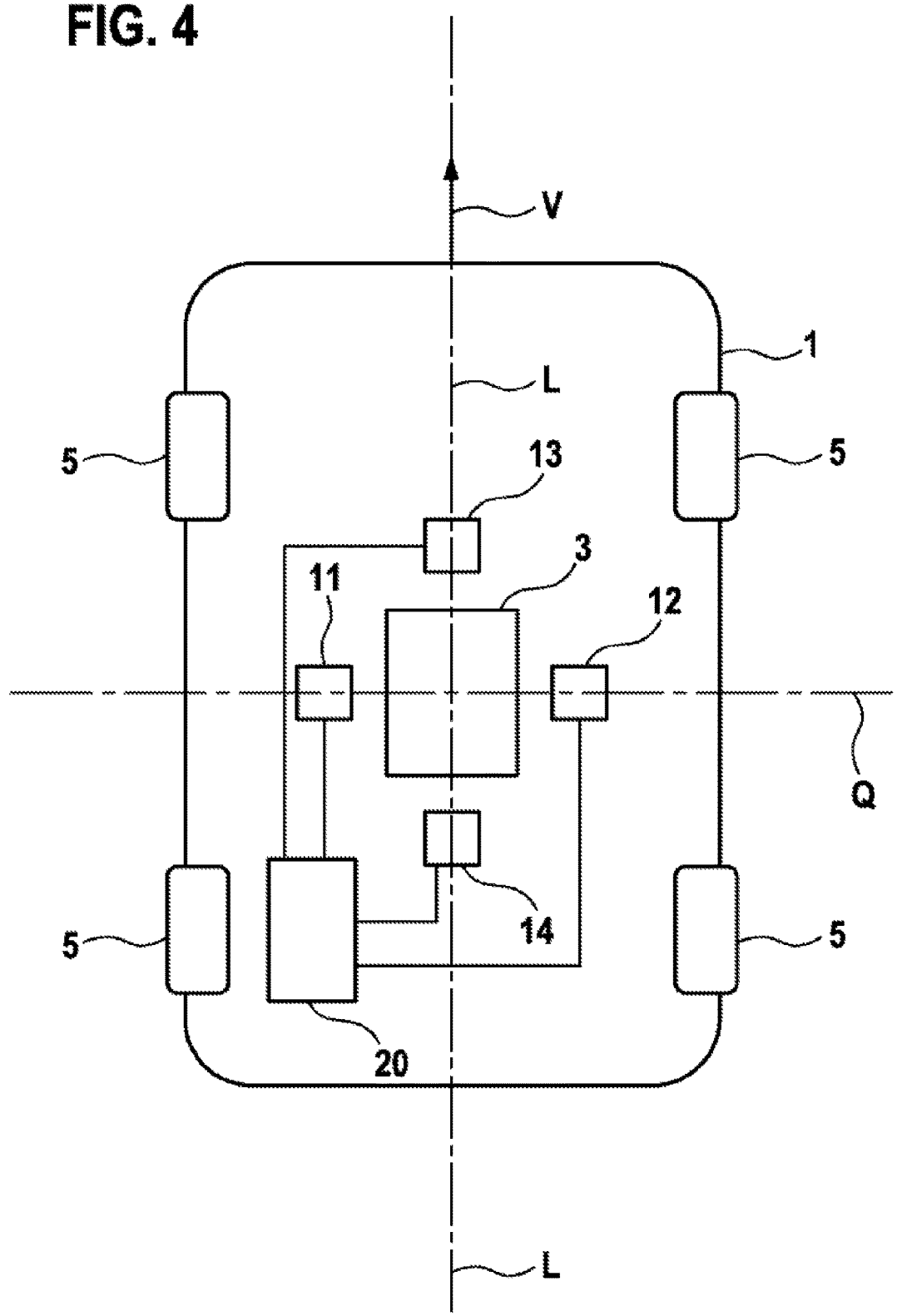
FIG. 4 shows a schematic illustration of a vehicle with an apparatus for ascertaining a position of a vehicle based on a third embodiment of the present invention.

FIG. 4 shows a schematic view of an apparatus for ascertaining a position of a vehicle according to a third embodiment of the present invention.

The third embodiment of the apparatus is essentially a development of the second embodiment. In comparison with the second embodiment, the third embodiment additionally has a third magnetic field sensor 13 and a fourth magnetic field sensor 14, which are likewise coupled to the computation device 20. According to the second embodiment, the third and fourth magnetic field sensors 13, 14 are arranged along the longitudinal axis L of the vehicle 1. If the reception coil 3 is not arranged in a manner centered on the longitudinal axis L, it is also possible for the third and fourth magnetic field sensors 13, 14 to be arranged along a line that runs parallel to the longitudinal axis L and that intersects the reception coil 3, for example. The third embodiment can allow faster and more accurate ascertainment of the position of the vehicle 1, particularly in the direction of the longitudinal axis L.

According to a fourth embodiment, the vehicle 1 has only the third or only the fourth magnetic field sensor 13, 14 arranged on it. This allows costs to be avoided.

Although the present invention has been described above on the basis of preferred exemplary embodiments, it is not limited thereto, but rather can be modified in diverse ways. In particular, the invention can be altered or modified in various ways without departing from the essence of the invention.

By way of example, the method according to the invention can also be used for automated positioning of moving transmission coils. When transmission coils are laid in a roadway for the purpose of inductive energy transmission, the magnetic field sensors, can also be used for automatically tracking a vehicle 1.

The invention claimed is:

1. A method for ascertaining a position of a motor vehicle, the method comprising:
   measuring at least one first magnetic field strength of a magnetic field at a respective first position by means of a first magnetic field sensor that is arranged on a vehicle;
   measuring at least one second magnetic field strength of the magnetic field at a respective second position by means of a second magnetic field sensor that is arranged on the vehicle at a distance from the first magnetic field sensor;
   ascertaining position data for the vehicle at least by comparing data that are based on the measured first and second magnetic field strengths with a predetermined magnetic field information item of the magnetic field; and
   outputting a signal on the basis of the position data that includes information about where a reception coil of the vehicle is currently situated relative to a transmission coil disposed in a charging position,
   wherein the measurement of the first and second magnetic field strengths is performed regularly or continuously.

2. The method as claimed in claim 1, wherein the magnetic field is produced by formation of a residual magnetization in a coil.

3. The method as claimed in claim 1, wherein the magnetic field is produced by application of a voltage to a coil.

4. The method as claimed in claim 1, wherein the magnetic field is produced continuously or in a pulsating manner.

5. A method for ascertaining a position of a motor vehicle, the method comprising:
   measuring at least one first magnetic field strength of a magnetic field at a respective first position by means of a first magnetic field sensor that is arranged on a vehicle;
   measuring at least one second magnetic field strength of the magnetic field at a respective second position by means of a second magnetic field sensor that is arranged on the vehicle at a distance from the first magnetic field sensor;
   ascertaining position data for the vehicle at least by comparing data that are based on the measured first and second magnetic field strengths with a predetermined magnetic field information item of the magnetic field; and
   outputting a signal on the basis of the position data,
   wherein a first magnetic field strength gradient is determined at a third position, a second magnetic field strength gradient is determined at a fourth position, or both; and ascertaining position data of the vehicle is additionally based on a comparison of the first and/or the second magnetic field strength gradient with the predetermined magnetic field information item of the magnetic field.

6. A method for ascertaining a position of a motor vehicle, the method comprising:
   measuring at least one first magnetic field strength of a magnetic field at a respective first position by means of a first magnetic field sensor that is arranged on a vehicle;
   measuring at least one second magnetic field strength of the magnetic field at a respective second position by means of a second magnetic field sensor that is arranged on the vehicle at a distance from the first magnetic field sensor;
   ascertaining position data for the vehicle at least by comparing data that are based on the measured first and second magnetic field strengths with a predetermined magnetic field information item of the magnetic field; and
   outputting a signal on the basis of the position data,
   wherein at least one further magnetic field sensor, which is arranged on the vehicle, each magnetic field sensor being at a distance from every other magnetic field sensor, is used to measure at least one third magnetic field strength of the magnetic field simultaneously with the measurement of the first magnetic field strength and simultaneously with the measurement of the second magnetic field strength;
   wherein the ascertainment of the position data of the vehicle is additionally also based on a comparison of data that are based on the at least one third magnetic field strength with the predetermined magnetic field information item of the magnetic field.

7. The method as claimed in claim 1, further comprising:
   wirelessly transmitting the predetermined magnetic field information item.

8. An apparatus for ascertaining a position of a vehicle, comprising:
   a first magnetic field sensor that is arranged on a vehicle for measuring at least one first magnetic field strength of a magnetic field;
   a second magnetic field sensor that is arranged on the vehicle at a distance from the first magnetic field sensor for measuring at least one second magnetic field strength of the magnetic field; and
   a computation device that is arranged on the vehicle and that is configured to:
      compare at least data that are based on the first and second magnetic field strengths of the magnetic field with a predetermined magnetic field information item of the magnetic field, and
      ascertain position data for the vehicle based on the magnetic field strengths and with the predetermined magnetic field information item, the position data including information about where a reception coil of the vehicle is currently situated relative to a transmission coil disposed in a charging position,
   wherein the measurement of the first and second magnetic field strengths is performed regularly or continuously.

9. A system for ascertaining a position of a vehicle, the system comprising:
   a first magnetic field sensor that is arranged on a vehicle for measuring at least one first magnetic field strength of a magnetic field;
   a second magnetic field sensor that is arranged on the vehicle at a distance from the first magnetic field sensor for measuring at least one second magnetic field strength of the magnetic field; and
   a computation device that is arranged on the vehicle and that is configured to:
      compare at least data that are based on the first and second magnetic field strengths of the magnetic field with a predetermined magnetic field information item of the magnetic field, and ascertain position data for the vehicle based on the magnetic field strengths and with the predetermined magnetic field information item, wherein the measurement of the first and second magnetic field strengths is performed regularly or continuously.

10. The method as claimed in claim 1, including automatically controlling the position of the motor vehicle in response to the signal, and wherein the signal is a control signal.

11. The method as claimed in claim 1, including the step of providing an audible instruction in response to the signal, wherein the signal is a control guideline.

12. The method as claimed in claim 8, wherein the computation device is configured to automatically control the position of the motor vehicle in response to the position data.

13. The method as claimed in claim 8, wherein the computation device is configured to provide an audible instruction as a control guideline.

14. . The method as claimed in claim 9, wherein the position data includes information about where a reception coil of the vehicle is currently situated relative to a transmission coil disposed in a charging position.

15. The method as claimed in claim 9, wherein the computation device is configured to automatically control the position of the motor vehicle in response to the position data.

16. The method as claimed in claim 9, wherein the computation device is configured to provide an audible instruction as a control guideline.

* * * * *